United States Patent [19]

Gheen

[11] 4,350,295
[45] Sep. 21, 1982

[54] LINEAR MOVE DEVELOPMENTS

[75] Inventor: Lyndle G. Gheen, Eugene, Oreg.

[73] Assignee: Pierce Corporation, Eugene, Oreg.

[21] Appl. No.: 119,845

[22] Filed: Feb. 8, 1980

[51] Int. Cl.³ .............................................. A01G 25/09
[52] U.S. Cl. ................................ 239/178; 137/355.21; 239/721
[58] Field of Search ........... 137/355.2, 355.21, 355.22; 239/178–181, 183–190, 195, 197, 709–713, 717–721

[56] References Cited

U.S. PATENT DOCUMENTS

3,281,080 10/1966 Hogg ..................................... 239/183
4,164,323 8/1979 Ellison ................................. 239/713

Primary Examiner—Andres Kashnikow
Attorney, Agent, or Firm—Klarquist, Sparkman, Campbell, Leigh, Whinston & Dellett

[57] ABSTRACT

A linear move has its opposite end towers alternately made the master or lead tower to cause the move to first swing slightly one way to give corrrective endwise movement in one direction and then swing slightly the other way to give corrective endwise movement in the opposite direction. A control mechanism determines which end tower is the master tower and includes a feeler device positioned within a guide furrow. A main line supplies irrigation water under pressure through an interconnected long elastic hose, rigid U-shaped tow tube, and short hose to the end tower. A cable on a winch drum mounted on the end tower is connected to the tow tube and, when the end tower is not moving, a winch motor drives the drum to pull in the cable, the tow tube and the end portions of the hoses connected to the tow tube so that, as the move moves, it does not pull the heavy long hose but only pulls the lighter short hose. When the cable has been taken up enough to place the hoses in a desired position, the winch motor stops. A dynamic brake keeps the drum from overrunning as the long elastic hose contracts from its tensioned condition arising during towing. When the end tower is driven, cable is payed out while a drag brake prevents overrunning of the winch drum.

17 Claims, 24 Drawing Figures

LINEAR MOVE DEVELOPMENTS

SUMMARY OF THE INVENTION

This invention relates to an improved linear move, and has for an object thereof the provision of an improved linear move.

Another object of the invention is to provide a linear move which swings alternately in opposite directions as needed to compensate for endwise movement thereof.

A further object of the invention is to provide a multiple tower linear move in which an end tower at one end of the move is first made the master or lead tower of the move and then the tower at the other end of the move is made the master or lead tower.

Another object of the invention is to provide a linear move in which a feeler arm mechanism carried on one tower is moved along a guide extending along a field to be irrigated and causes the move to compensate for endwise movement of the move.

Another object of the invention is to provide a water supply for an irrigation line move such that the move is supplied with water by an elongated hose which is pulled by a winch on the move.

Another object of the invention is to provide an irrigation line move which is supplied with water from a main line through a long hose and a short hose connected at one end to the move and which has a winch mounted on the move with a cable connected to the hoses, the winch pulling the long hose only when the portion of the move carrying the winch is stopped so that, when such portion of the move is moving, it pulls only the short hose.

Another object of the invention is to provide an irrigation line move carrying a cable connected to a U-shaped tow tube to which a short hose to the move is connected and to which a long hose from a main line also is connected.

Another object of the invention is to provide an intermittently movable linear move with a winch mounted on the move and operable, while the portion of the move to which the winch is mounted is stopped, to pull a water supply hose.

Another object of the invention is to provide a move which pulls only a short water supply hose when it is moving, and with a winch carried by a tower, such as the end tower, which repositions the short hose and a long supply hose when the tower carrying the winch is stationary and a ratchet leg is helping brace the stationary tower.

Another object of the invention is to provide a linear move movable intermittently with a winch carried thereby, the winch serving to pull a water supplying hose while the portion of the move carrying the winch is stopped and having a ratchetlike leg on the move to hold the move against rearward movement during operation of the winch.

A further object of the invention is to provide a linear move easily movable from one field to another.

An additional object of the invention is to provide a linear move capable of generally pivoting movement about an end tower so that the move travels in an arc about such end tower from one field to an adjacent field.

The foregoing and other objects, features and advantages of the present invention will become more apparent from the following detailed description, which proceeds with reference to the accompanying drawings.

PREFERRED EMBODIMENT OF THE INVENTION

Figures 3, 4, 5:
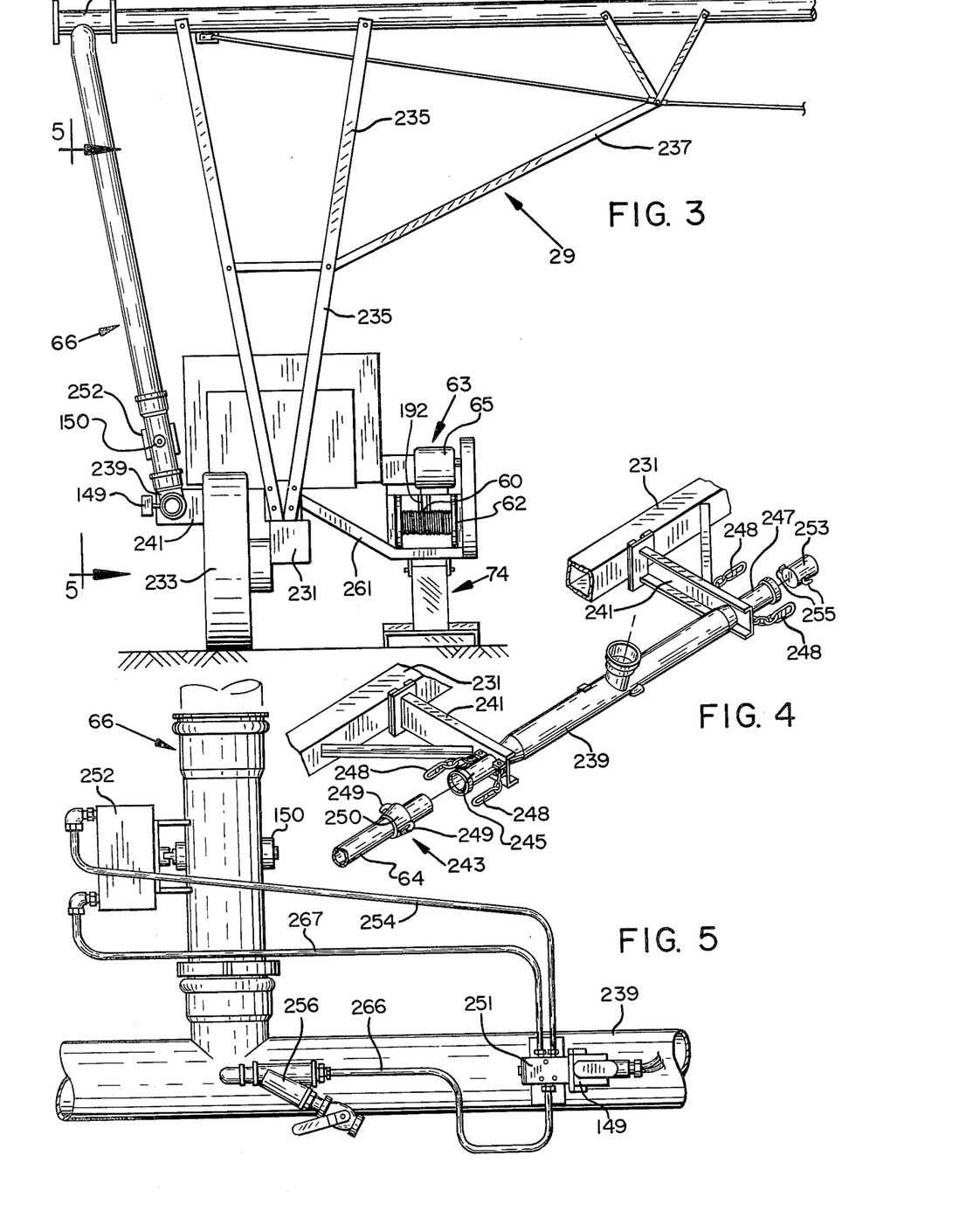
FIG. 3 is an enlarged, fragmentary rear elevation view taken along line 3—3 of FIG. 1.
FIG. 4 is an enlarged, fragmentary, partly exploded, perspective view of a portion of move of FIG. 1.
FIG. 5 is an enlarged, fragmentary, side elevation view taken along line 5—5 of FIG. 3, with hoses and pipes deleted for clarity.
Figures 14, 15:
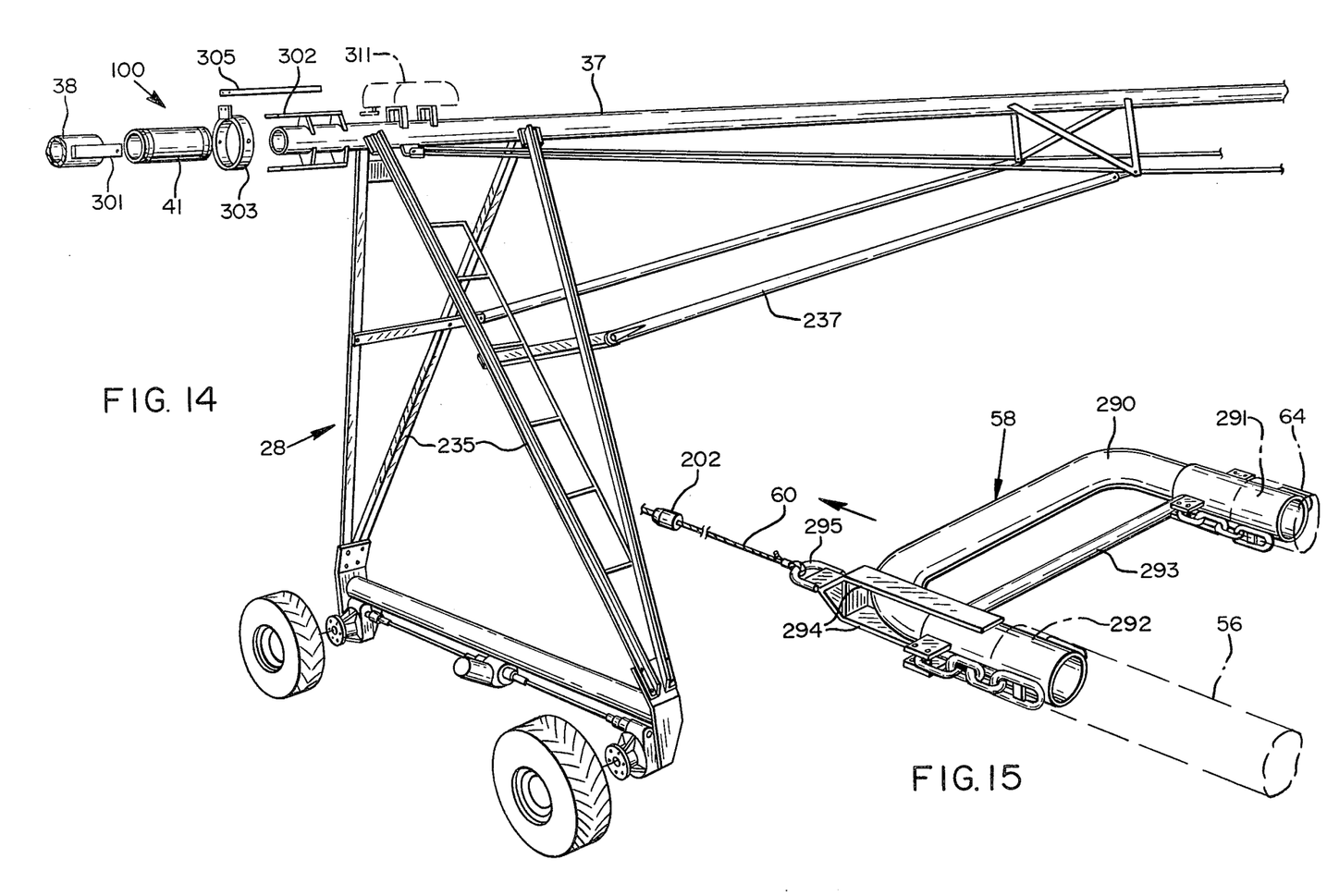
FIG. 14 is an enlarged, fragmentary, partly exploded, perspective view of a tower of the move of FIG. 1.
FIG. 15 is an enlarged, fragmentary, top plan view of a U-shaped coupling and water supplying hoses.

An improved linear move forming a specific embodiment of the invention includes nine individually propelled towers or carriages 21 to 29 (FIGS. 1 and 2), which carry pipe sections 31 to 38. These sections in turn carry well-known sprinklers 40 (only a few being shown and these schematically because of the small scale). Sections 31 to 38 are connected together by flexible couplings 41, one of which is shown in FIG. 14, adjacent each of the towers 22 through 28 to form a pipeline which is plugged at the end of pipe section 31, carried by the towers 21 and 22, and which is supplied with water under pressure from a main line pipe 50. In the illustrated form of move the main line pipe 50 lies along a field 54 at one end of the move and is positioned generally in the direction of travel of the move. Main line pipe 50 has manually controlled valved outlets 51, spaced substantially equally apart therealong and to each of which a supply end 55 of a long elastic hose 56 can be coupled manually. The other end 57 of hose 56 is connected to a rigid, tubular, curved connector such as a metal U-shaped tow tube or coupling 58. For towing purposes, as explained below, the tow coupling is connected to the free end of a winch cable 60 which has its other end connected to a winch drum 62 (FIG. 3) of a winch 63 carried by the tower 29. The tow coupling is also connected to one end of a shorter hose 64, with hose 64 being connected to a valved pipe 66 (FIG. 3) on the tower 29. The valved pipe 66 in turn is connected to the pipe section 38 so that water can be supplied to pipe section 38, and hence the irrigation pipe line, from main line 50 through long hose 56, tow tube 58, shorter hose 64, and valved pipe 66. This arrangement is such that wide bights 61 and 68 are formed in the respective hoses 56 and 64 so that the hoses are not kinked when they are towed. The rigid tow coupling 58 holds the hoses in a gentle curve so that cable 60 does not kink them during towing. The shorter hose 64 is preferably slightly longer than the length of each movement of the move from one set to the next so that the bight 68 is always present. The length of the hose 56 is preferably greater than several times the length between sets and in the illustrated embodiment is over half the distance between two of the valved outlets 51. As a more specific example, a typical short hose is sixty (60) feet long and a typical long hose is four hundred (400) feet long. Thus, hoses 56, 64 and tow tube 58 comprise one form of hose means with cable 60 being connected to it intermediate its ends.

Figures 1, 2:
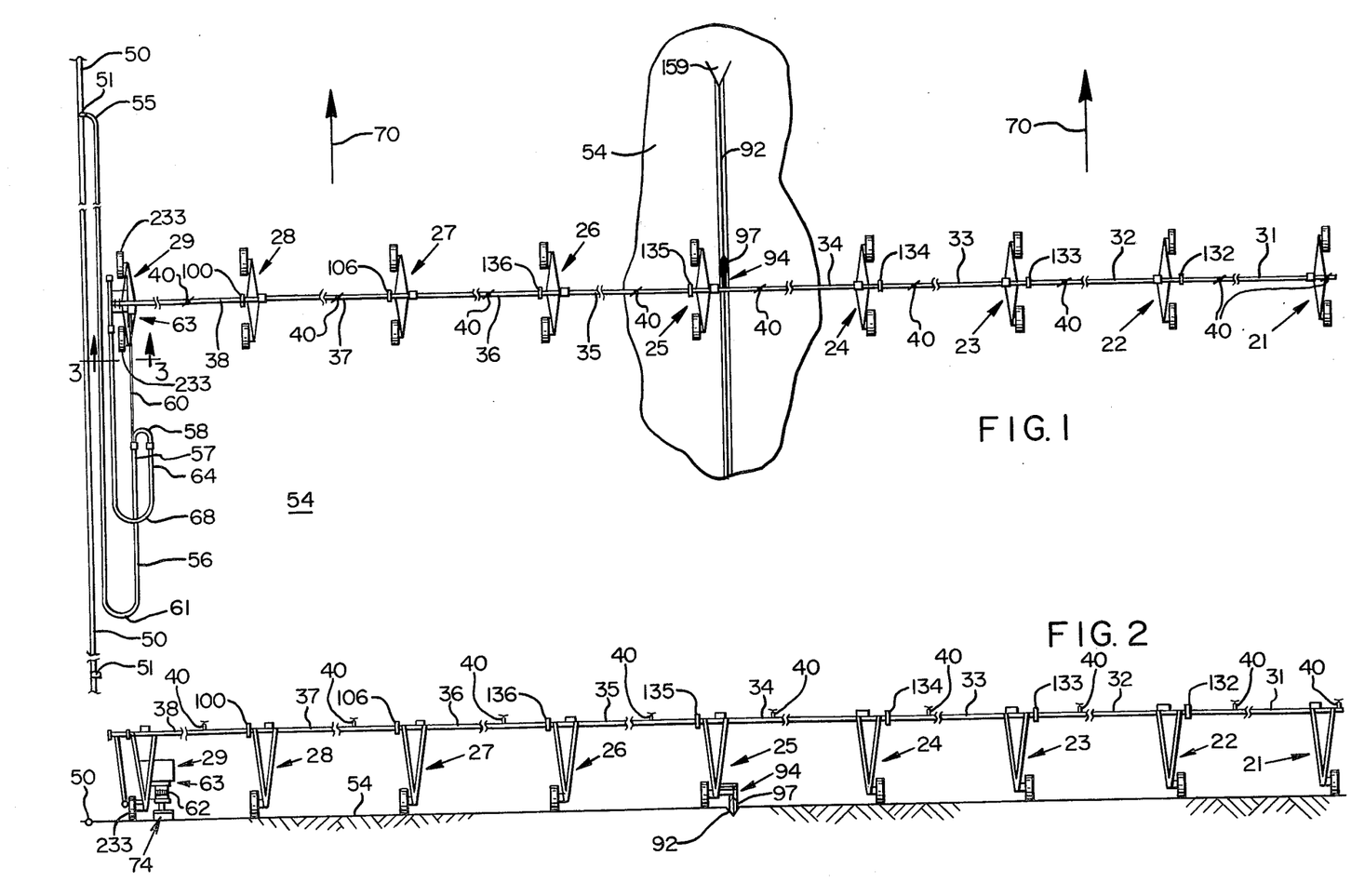
FIG. 1 is a top plan view of a linear move forming one embodiment of the invention.
FIG. 2 is a rear elevation view of the move of FIG. 1 with hoses deleted for clarity.

Assuming that the move is being advanced in its forward direction, that direction indicated by arrows 70 in FIG. 1, the move, under the control of a commercially available percentage timer 72 (FIG. 17), will move for a selected percentage of each minute and will stop for the remainder of that minute. The move sprinkles continuously as long as water under pressure is supplied to the irrigation pipeline even though its motion is periodic. While the end tower 29 of the move is being moved, the winch 63 pays out the cable 60 so that the long hose 56 is not towed and so that the move tows only the short, lighter hose 64 (FIG. 1). On the other hand, each time end tower 29 stops, winch motor 65 (FIG. 3) is driven to pull the tow tube 58 and connected ends of the hoses 56 and 64 toward the winch. This is accomplished by energizing a winch forward control relay 67 (FIG. 17) while a winch reverse control relay 69 is de-energized.

Figure 18:
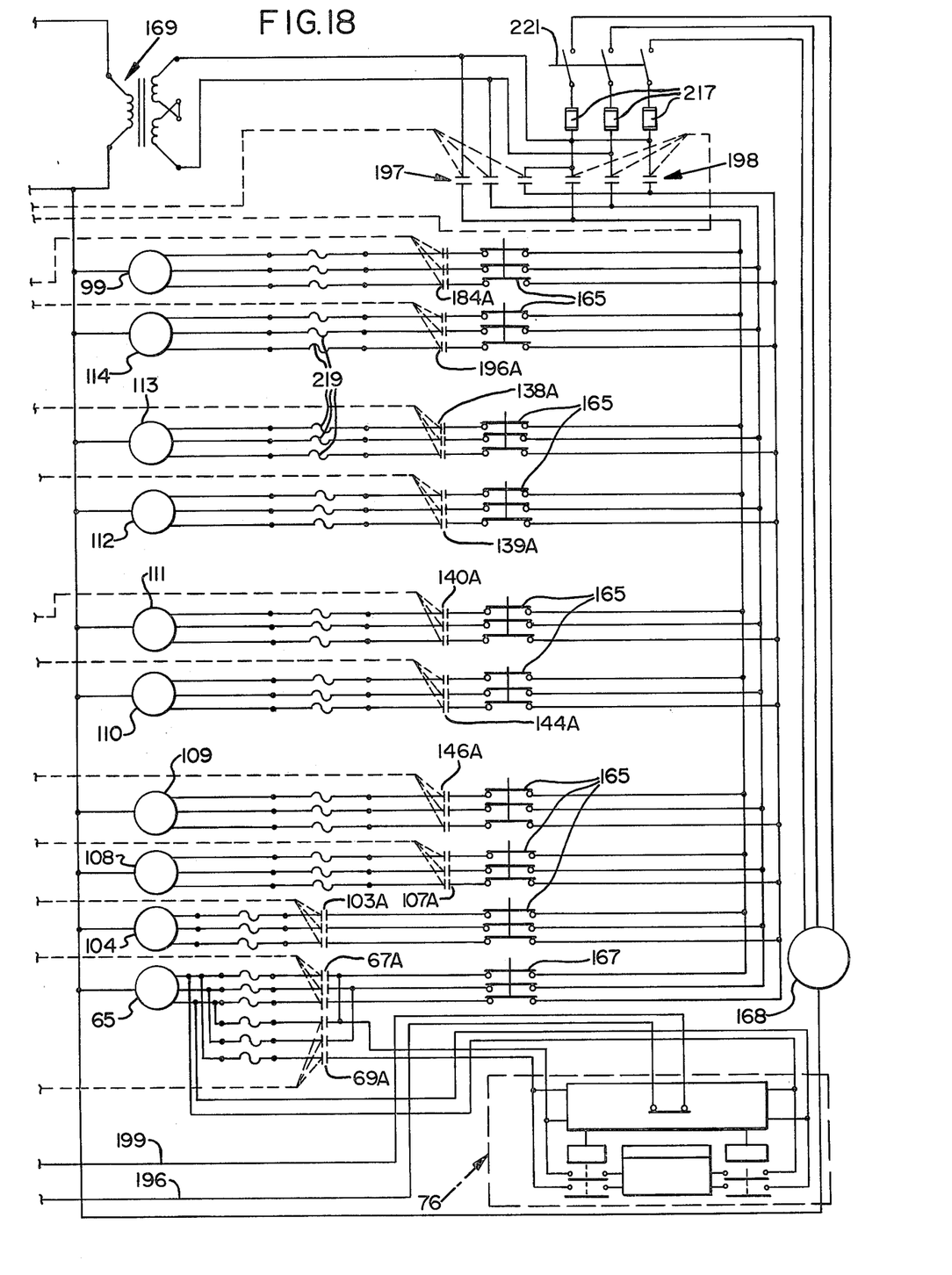

The tower 29 also carries a ground engaging ratchet device 74 (FIGS. 3 and 6) which is operable to permit free forward travel of the tower 29 and to block rearward travel of the tower 29, particularly when winch 63 is pulling in cable. Also, each time the long elastic hose 56 (FIG. 1) is pulled forwardly by winch 63, it is stretched. This stretching causes the hose to exert a large rearward pull or tension on the move at the end of winding in of the cable 60 by the winch 63. To dissipate this tension, the winch drum 62 unwinds until the hose has contracted to its normal, substantially unstressed length. Unwinding of the winch drum is controlled by a dynamic electrical brake 76 (FIG. 18). Such brakes are commercially available and one suitable brake is Model SS 405 J produced by AMBI Tech Industries, Incorporated of Hillsdale, New Jersey. When the move is moved forward, a light, mechanical drag brake 78 (FIG. 12) keeps the winch drum 62 from overrunning as the cable is payed out therefrom.

Figure 11:
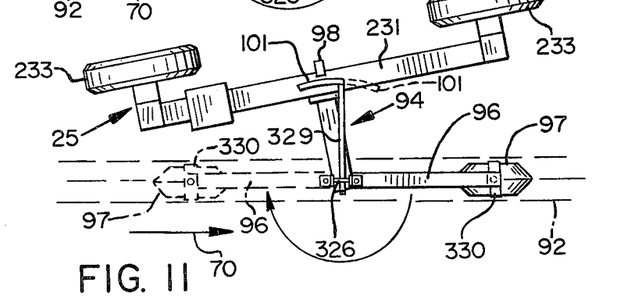

To keep the move within close limits of endwise movement or drift thereof, there is provided a guide trench or trough 92 (FIG. 1) in the field 54 and extending parallel to the main line pipe 50 and a feeler mechanism 94. As best seen in FIGS. 8 through 11 and 16, feeler mechanism 94 includes an arm 96 pivotally mounted on the tower 25 and extending therefrom in the direction of movement of the move (either forward in the direction of arrows 70, or in the opposite direction, if the move is moving in a reverse direction from that shown in FIG. 1). More specifically, bearings 320 pivotally mount arm 96 on a horizontal shaft 321. Shaft 321 is rigidly mounted on a vertical shaft 322 which is in turn mounted in bearings 323 fixed rigidly to an arm 324. Arm 324 is fixed rigidly to and projects perpendicularly from one side of a chassis 231 which is supported by wheels 233 of the tower. Hence, arm 96 is pivotal upwardly and downwardly about shaft 321 as well as about the axis of shaft 322. A guide wheel 97 is carried by arm 96 for travel within trench 92. The wheel 97 is mounted in a fork 330 journaled in bearings 331 mounted to the free end of arm 96 so that the wheel is pivotal about a generally vertical axis. Springs 332 connected to fork 330 and to a bracket 333 on arm 96 tend to keep wheel 97 centered relative to arm 96. A bracket 325 keyed to the shaft 322 supports a hinge 326 which carries an arm 329. The free end of arm 329 carries an arcuate magnet 101 positioned adjacent to one end of a magnetic proximity switch or sensor 98, which in turn is mounted on bracket 327 rigidly connected to the chassis 231. A limit switch 164 is actuated by a downwardly projecting fork 328 on bracket 325 to stop the move and irrigation if the arm 96 is swung too far, such as if wheel 97 jumps out of trench 92. Also, the arm 96 is swingable 180° for forward or reverse drive of the line move. Assuming the movement of the move to be in the forward direction, that of the arrows 70, and that the move has drifted endwise to the extreme left of the desired movement, as viewed in FIG. 1, the wheel 97 carried by the arm 96 engages the left hand wall of the trench 92 and causes the positioning of magnet 101 in front of or covering the adjacent end of magnetic proximity switch 98 such as shown in FIG. 11. As a result, proximity switch 98 opens and de-energizes a relay 120 (FIG. 17) causing contacts 115, 116 to close and 117, 118 to open. This causes the tower 29 (FIG. 1) to become the master or lead tower so that its motor 99 (FIG. 18) is always started first by a relay 184 (FIG. 17), being energized, and closing contacts 184A, all the other towers being stopped. Furthermore, when the tower 29 (FIG. 1) is somewhat ahead of the tower 28, the pipe section 38 becomes angled enough forwardly of the pipe section 37 that a known alignment switch device 100 (FIG. 13) is actuated. This controls a switch 100A (FIG. 17) to actuate a relay 103 closing contacts 103A to start motor 104 (FIG. 18) of the tower 28. Then both the towers 28 and 29 (FIG. 1) are driven until the pipe section 37 has swung ahead of the pipe section 36 sufficiently for an alignment switch device 106 (FIG. 1), like switch 100, located at the tower 27 to be actuated to control a switch 106A (FIG. 17) to energize a relay 107 (FIG. 17) closing contacts 107A to start motor 108 (FIG. 18) of the tower 27. Similarly, each of motors 109, 110, 111, 112 and 113 of respective towers 26, 25, 24, 23 and 22

Figures 9, 10:
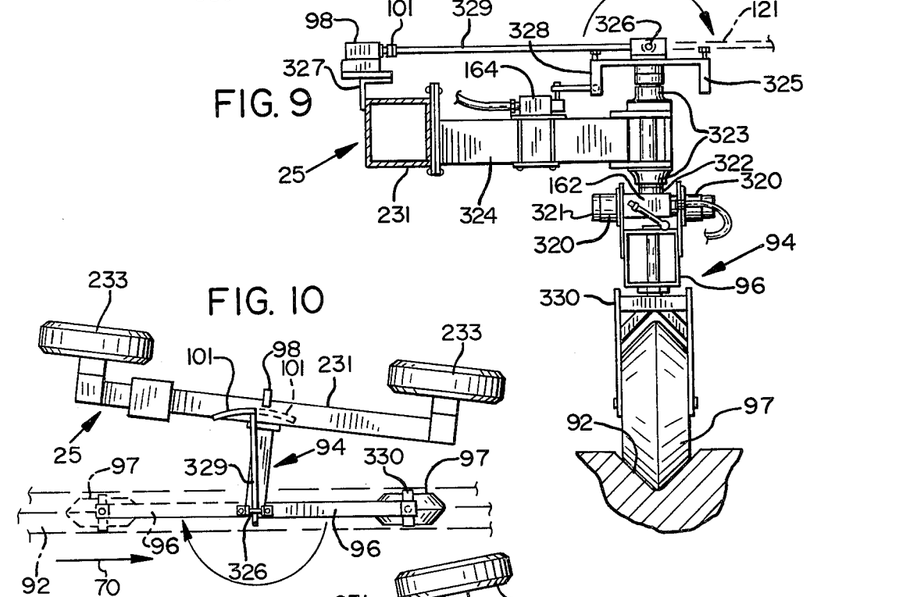
FIG. 9 is a vertical sectional view taken along line 9—9 of FIG. 8.
FIGS. 10 and 11 are enlarged, fragmentary views of a guide portion of the move of FIG. 1 in different operating positions.

(FIG. 1) are brought in seriatim by relays 146, 144, 140, 139, 138 closing respective contacts 146A, 144A, 140A, 139A and 138A until all the towers are operative. However, because contact 116 is closed, relay 196 closes contacts 196A to operate motor 114 of tower 21 simultaneously with motor 113. Each time the move is started, the above sequence is followed. This has the effect of swinging the move somewhat clockwise, as viewed in FIG. 1, so that the move edges slightly to the right until the wheel 97 engages the right hand wall of the guide trench 92. Then, further swinging movement of the move in the clockwise direction moves magnet 101 so that it is no longer in front of the adjacent end of proximity switch 98, such as shown in FIG. 10. As a result, proximity switch 98 closes so that relay 120 (FIG. 17) is energized to open contacts 115 and 116 and close contacts 117 and 118. This reverses the control circuitry of the move to cause the tower 21 (FIG. 1) to become the lead or master tower. When the tower 21 is the master, its tower starting relay 196 closes contacts 196A causing motor 114 (FIG. 18) to start first. As tower 21 moves, motor 113 of the tower 22 (FIG. 1) is energized when the pipe section 31 has swung counter-clockwise ahead of the pipe section 32 sufficiently to actuate an alignment switch 132A and in turn a motor start relay 138 which controls contacts 138A in the motor 113 circuit. The tower motors of the towers 23 to 28 then are brought in seriatim by alignment switches 133A–136A, 106A and 100A (FIG. 17) and relays 139, 140, 144, 146 and 107, the tower motor 99 (FIG. 18) of the tower 29 being energized with that of the tower 28. This swings the move somewhat counter-clockwise in FIG. 1 to cause the move to edge toward the left until shortly after the wheel 97 engages the left hand wall of the trench and the move is swung somewhat further counter-clockwise, in which condition the feeler mechanism again opens the switch 98 to reverse the circuitry and again make the tower 29 the lead or master tower. In effect, there is a slight waddling or crabwise movement of the move to keep the endwise movement within close limits and to keep the movement of the move always quite close to the direction of the arrows 70. In the preferred embodiment, with a U-shaped trench 92, the total endwise movement of the move is about four (4) inches.

The alignment switch devices 100, 106 and 132–136 include extreme misalignment or safety switches 141 (FIG. 17), (only three of seven switches 141 all in series being shown) in a safety line 142. If any of the switches 141 opens due to extreme misalignment of the move, a safety relay 160 is de-energized to open contacts 211, 212 and stop further movement of the move. Also, when contacts 211, 212 are open, a safety solenoid 149 (FIG. 17) is de-energized to close a butterfly valve 150 (FIG. 5) in the valved pipe 66 thereby shutting off the supply of water to the line and stopping sprinkling. A manually controlled switch 145 (FIG. 17) also may be opened to de-energize solenoid 149 and stop sprinkling when desired. The trench 92 has an upwardly inclined ramp 159 at each of its ends. When the wheel 97 travels up a ramp 159, arm 96 swings upwardly and opens a limit switch 162 (FIGS. 9 and 17) so that safety relay 160 is de-energized causing the move to stop and the valve 150 (FIG. 5) to close as explained above. The direction of movement of the move may then be reversed by manually swinging the arm 96 180° to point in the opposite direction and repositioning magnet 101, as shown in dashed lines in FIGS. 10 and 11.

Manually operable switches 161 (FIG. 17) are located on each tower (though, for simplicity, only five are shown). These switches are connected in series in the safety line 142 and are operable to open the safety line and de-energize relay 160 to shut down the move when a worker is working at any of the towers. Similarly, when a worker is working at the guide wheel 97, he can open a switch 163, connected in series in the safety line 142 to de-energize safety relay 160 and shut down the move. Also, as previously mentioned, if the guide wheel 97 (FIG. 1) should ride clear up out of the guide trench 92, the arm 96 opens a limit switch 164 (FIG. 17) in series in safety line 142 to de-energize relay 160 and stop the move. Manual power disconnect switches 165 are provided, one associated with each tower motor, and at each tower, for opening the power supply lines to its associated motor as desired, such as during maintenance. For safety and convenience, switches 161 and 165 open simultaneously. Also, a manual power disconnect switch 167 is provided at the winch.

A three phase, 480 volt, sixty hertz power generator 168 (FIGS. 6 and 18) is provided and driven by a Diesel engine 147 to supply power to the move. A transformer 169 (FIG. 18) steps down a portion of the generator 168 output to provide a lower control voltage to the control circuit. A manually operated forward-reverse switch 171 (FIG. 17) can be moved from its open position shown to either a forward position closing contacts 172 and 173 or a reverse position closing contacts 174 and 175. The position of switch 171 determines the direction of travel of the move either forward, as shown by arrows 70, or in reverse. Also, a momentary start switch 176 is provided. A forward relay winding 177 is energized when switch 171 is in its forward position and closes contacts 197 (FIG. 18) to deliver power to the tower motors in a proper phase relationship so that the motors drive the towers forwardly. Conversely, when switch 171 is in its reverse position a relay 178 is energized to close contacts 198 (FIG. 18) to deliver power to the tower motors in a phase relationship which reverses the direction in which the towers are driven. An all tower timer operates a relay 179 to shut down the move if a clutch control 180 is not energized in each ten minute period as a result of energization of relay 144 and motion of tower 25. A feedback preventing relay 193 is energized when switch 171 is in its reverse position to close contact 194 and open contact 195 under these conditions.

A safety relay 160 is de-energized whenever any of the switches 141, 161, 162, 163, 164 or the contact 179A open to open its contacts 211 and 212, which parallel the momentary starting switch 176, and shut off power to the control circuit. The percentage timer relay controls contact 215 to close it each time the move is to run and open it each time the move is to stop. Also, the usual overload circuit breaking devices 217 and 219 (FIG. 18) are provided. Additional overload circuit breaking devices, not shown, are also provided in the conductors leading to relays 72, 196, 138, 139, 140, 144, 146, 107, 103, 67 and 69. Also, a manual switch 221 (FIG. 18) positioned on the tower 29, when closed, connects the generator 168 to the circuit to provide power to the circuit.

As previously mentioned, a winch 63 is carried by a portion of the move such as one of the towers, in the illustrated form tower 29, for dragging and repositioning hoses 64, 56 when tower 29 stops moving. The winch is operable to pay out cable 60 as tower 29 is driven so that the tower pulls the short hose 64 as it moves, but does not have to drag the heavier long hose 56.

With reference to FIGS. 6, 12, 21, 22 and 23, winch 63 is mounted by a rigid off setting framework 261 to a chassis 231 of tower 29. This framework includes a vertical planar mounting plate 79 attached to a side surface of the chassis, a pair of horizontal parallel spaced channel members 80, 81 projecting perpendicularly outwardly from plate 79, and a motor mounting platform 82 attached to and supported above channels 80, 81 by bolts 83. In addition, the framework 261 includes a pair of spaced vertical angle members 84, 84a projecting downwardly from channel member 80 while similar angle members 85, 85a (only 85a being shown in FIG. 22) project downwardly from channel member 81. A side plate 86 interconnects angle members 84a, 85a and a similar side plate 87 interconnects angle members 84, 85. The framework 261 also includes suitable bracing members.

Winch drum 62 is keyed to a shaft 88 journaled to and extending between side plates 86, 87 and is driven by motor 65 through a chain and gear drive arrangement. The drive arrangement comprises a first small gear 105 mounted to the shaft of motor 65, a larger gear 89 keyed to one end of a shaft 90 which is supported by bearings 91 on platform 82, a second small gear 93 keyed to the other end of shaft 90 and a second large gear 95 keyed to shaft 88.

Figure 12:
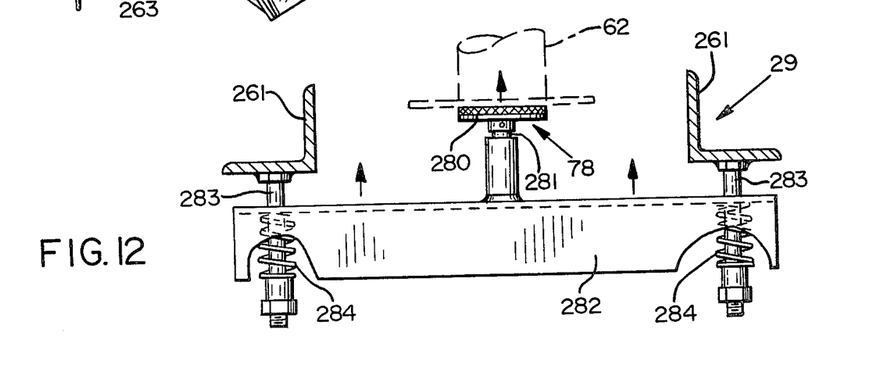
FIG. 12 is an enlarged, fragmentary, top plan view of a portion of a winch of the move of FIG. 1.
Figures 13, 16:
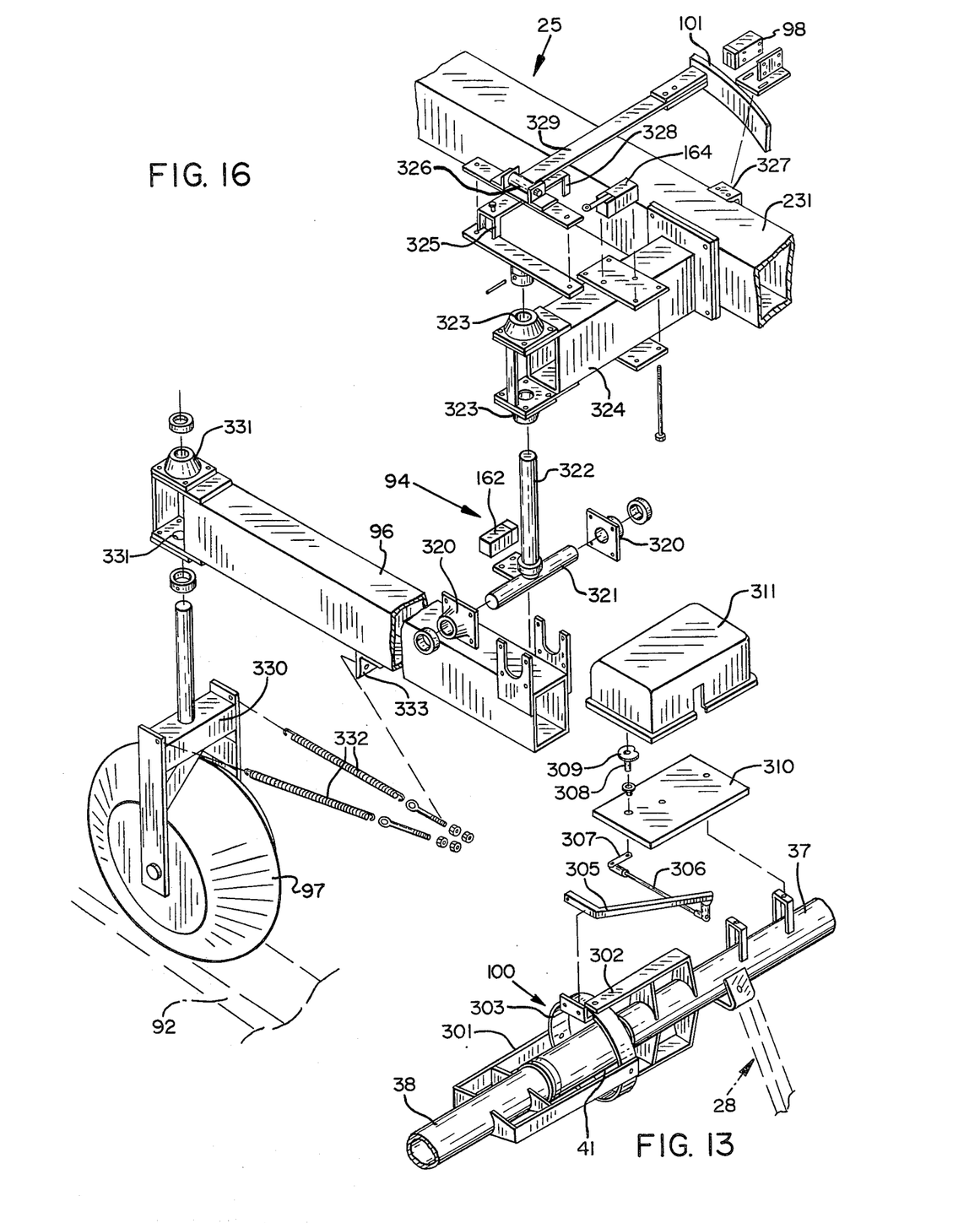
FIG. 13 is an enlarged, fragmentary, exploded view of an alignment control of the move of FIG. 1.
FIG. 16 is an exploded, perspective view of a guide mechanism of the move of FIG. 1, with the mechanism positioned for travel in a direction opposite to that shown in FIG. 1.

As best seen in FIG. 12, a mechanical drag brake 78 is provided for limiting the rate that cable 60 is payed out from winch 63. Mechanical brake 78 comprises a brake disc 280 urged against an end of the winch drum 62 by a spring-pressed splined shaft 281, carried by a bar 282, slidable on pins 283 and urged by springs 284 in a braking direction.

Figure 21:
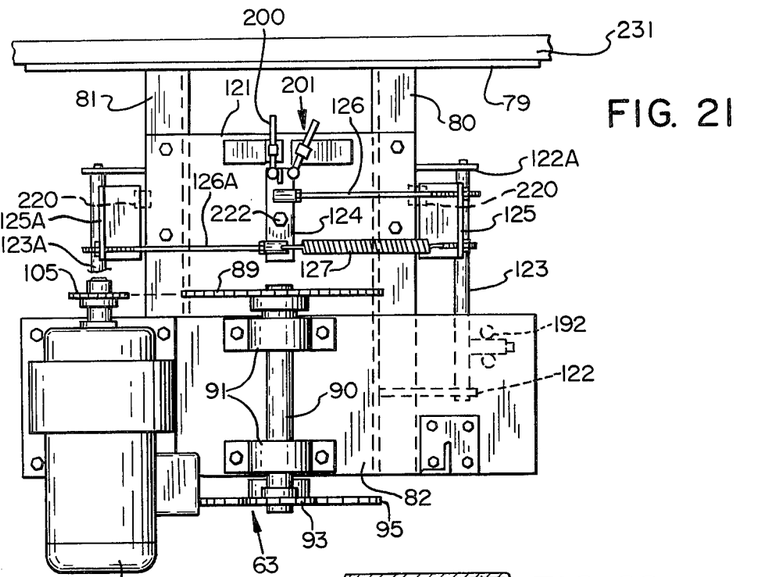
FIG. 21 is a top plan view of the winch portion of the move.
Figures 22, 23:
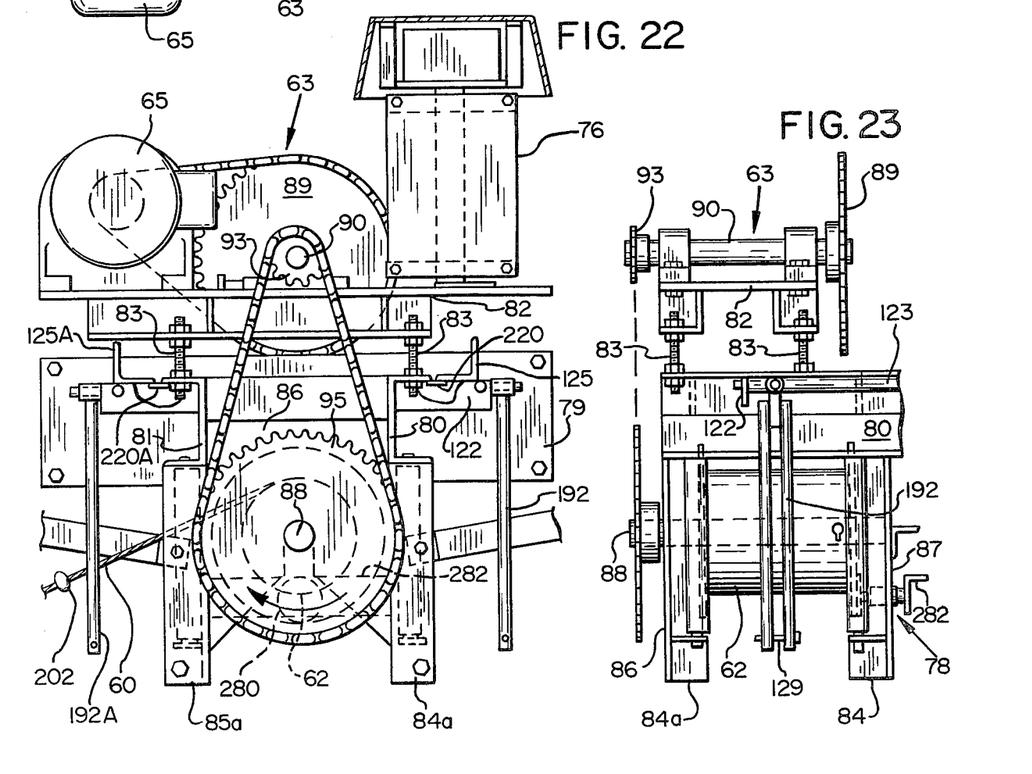
FIG. 22 is a side elevation view of the winch portion of the move.
FIG. 23 is a front elevation view of the winch of the move.

A cable trip mechanism, shown in FIGS. 21, 22 and 23, is mounted to the framework 261 for stopping the winch after the hoses 64, 56 have been repositioned. A similar trip mechanism is provided at both the front and rear of the framework so that one such mechanism is positioned to engage the cable regardless of the direction of travel of the move. Because of their similarity, only one such trip mechanism will be described. The trip mechanism includes a horizontal tube 123 pivotally supported by a rod with the ends of the rod connected to respective brackets 122, 122A which project from channel member 80. A fork or cable guide 192 projects downwardly from tube 123 and, during operation, cable 60 is threaded between the tines of the fork while a bolt 129 (FIG. 23), prevents the cable 60 from falling from the fork.

When the winch 63 pulls in a selected amount of cable and repositions the hoses 64, 56, a nubbin 202 mounted on the cable engages fork 192 and operates a switching mechanism to stop the winch from pulling on additional cable. More specifically, the switching mechanism includes a trigger 124 pivoted by a pin 222 to a plate 121 of framework 261 for pivoting movement about a vertical axis. A piece of angle iron 125 is welded to tube 123 and has its upper flange connected to one end of a spring 127 and also to one end of a rod 126. The other end of the spring 127 is connected to trigger 124 at one side of pin 222 and the other end of rod 126 is connected, by a ball joint, to trigger 124 at the opposite side of pin 222. Spring 127 biases angle iron 125 and tube 123 counter-clockwise in FIG. 22 with the lower flange of angle iron 125 against a stop 220 welded to the upper leg of channel member 80. When in this position, normally closed switch 200 is held open and safety switch device 201 which includes switches 201A, 201B (FIG. 17) is inoperable, for purposes explained below in connection with the operation of the winch circuit. When the winch 63 operates pulling in cable 60, eventually cable nubbin 202 engages fork 192 and pivots tube 123 clockwise in FIG. 22 so that rod 126 pivots trigger 124 clockwise and causes switch 200 to close. This stops the winch as explained below. If for some reason switch 200 fails, fork 192 continues to pivot until trigger 124 operates safety or backup switch device 201 to shut off the winch. When rod 126 is operably coupled to angle iron 125, the free end of rod 126A, connected at its other end by a ball joint to trigger 124 opposite spring 127, slides relative to angle iron 125A so that the fork 192A attached to this angle iron remains stationary. Conversely, when cable is payed out through fork 192A, as shown in FIG. 22, rod 126A is connected to angle iron 125A while rod 126 slides relative to angle iron 125.

Figure 17:
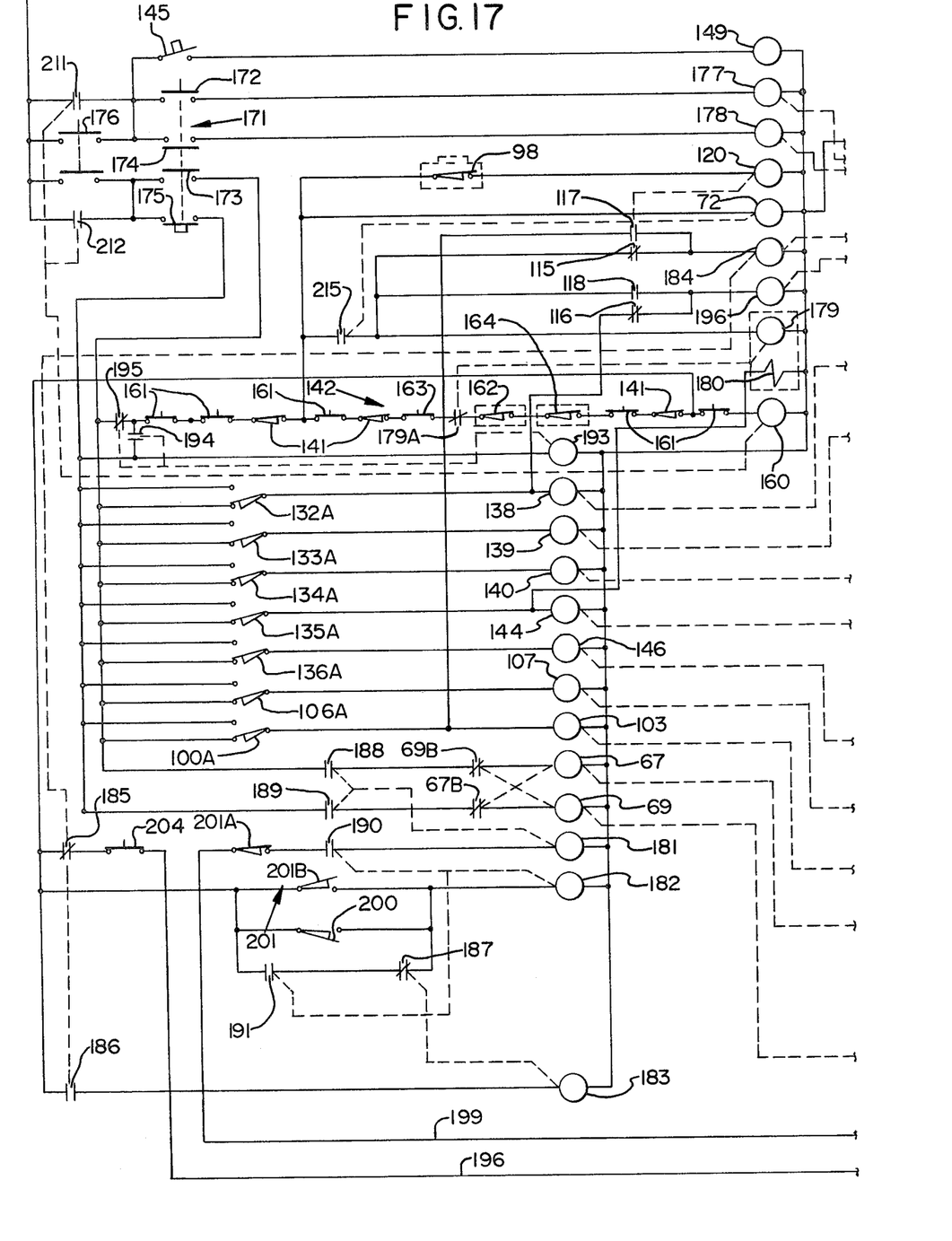
FIGS. 17 and 18, fitted together, are a schematic view of an electrical control circuit of the move of FIG. 1.

The winch control circuit will be described with reference to FIG. 17. Whenever the tower motor of the tower carrying the winch 63, in this case tower 29, is energized, relay 184 causes contact 185 to open and contact 186 to close. Because contact 185 is open, power does not reach winch control relay 181 and its contacts 188, 189 are open so that winch motor control relays 67, 69 are de-energized. Thus, contacts 67A, 69A are open so that winch motor 65 does not operate. Also, because contact 186 is closed, relay 183 is energized to open contact 187 so that no current flows through this contact to winch control relay 182. At the same time, switches 200 and 201B are open so that current does not reach relay 182 along these paths either. Consequently, cable 60 is payed out as tower 29 moves.

Subsequently, when tower motor relay 184 is de-energized and the movement of tower 29 stops, contact 185 closes while contact 186 opens. In this case, relay 183 is de-energized, because of open contact 186, causing contact 187 to close. However, current does not flow through contact 187 at this time because contact 191 is open. That is, switches 200 and 201B are open so that relay 182 is not energized and its contact 190 is closed and its contact 191 is open. In contrast, current passes through contact 185, along line 196 to brake 76, along line 199 through closed switch 201A and closed contact 190 to winch control relay 181. When this occurs, contacts 188, 189 close and power is fed to either winch forward control relay 67 or winch reverse control relay 69 depending upon the position of manually controlled switch 171. Assuming the move is traveling forward, in the direction of arrows 70, then switch 173 is closed and power is supplied through contact 188, a closed contact 69B and to winch forward control relay 67. At the same time, contact 175 is open so that no power reaches contact 189, closed contact 67B or winch reverse control relay 69. For additional safety, when relay 67 is energized, contact 67B opens to insure that no power reaches winch reverse control relay 69 while winch forward control relay 67 is energized. Also, while relay 67 is energized, contacts 67A close causing the winch motor to take up cable.

Cable is taken up until nubbin 202 engages fork 192 (FIG. 22), as explained above, and causes switch 200 to close. When switch 200 closes, relay 182 is energized opening contact 190 and closing contact 191. Because contact 190 opens, relay 181 is de-energized and contacts 188, 190 open. Therefore, power does not reach either relay 67 or 69 so that contacts 67A open (contacts 69A remain open) and the winch motor stops running. However, immediately following the running of winch 63, the long hose 56 is in an extremely tensioned and stretched condition. Because contact 190 opens, current stops flowing on line 199 and the electronic brake 76 is activated to cause winch motor 65 to act as a braking generator for a preselected time, determined by a timer within the brake, such as ten seconds. This permits cable to pay out slowly, during the time brake 76 is applied, so that the hoses contract at a controlled slow rate to a substantially unstretched state. This torque applied by brake 76 and the time brake 76 is applied is adjustable. As this cable pays out, switch 200 again opens, because nubbin 202 no longer engages fork 192. However, because power is supplied through contacts 191, 187 to relay 182, contact 190 remains open and the winch motor remains off even though switch 200 has reopened. If for some reason switch 200 fails to close, further pivoting of fork 192 causes safety switch 201 to operate so that its switch portion 201B closes and 201A opens to shut off the winch motor.

Thereafter, when tower motor relay 184 is again energized to start tower motor 99 and tower 29 moving, contact 185 opens and contacts 186 closes. This in turn energizes relay 183 causing contact 187 to open. As a result, relay 182 is de-energized so that contact 191 opens and contact 190 closes. The circuit remains in this state until relay 184 is again de-energized and tower 29 stops. The cycle described above is then repeated.

The ninth tower 29 (FIGS. 1-7) includes a chassis 231 carried by wheels 233 driven by the motor 99 (FIG. 18). The chassis 231 (FIGS. 3-6) carries truss-like tower members 235, to which the pipe section 38 and known trusswork 237 are secured. The lower end of the valved pipe 66 is connected to a T-coupling 239 carried by brackets 241 connected to the chassis. The hose 64 has a coupler 243 adapted to be connected to coupler 245 if the move is traveling forward, or coupler 247 if the move is traveling in the opposite direction, with chains 248 connected to hooks 249 of a ferrule 250. A plug 253 with hooks 255 is connected to the coupler 245 or 247 which is not connected to hose 64. Thus, hose 64 is always connected to the trailing end of the T-coupling, depending on the direction of travel of the move.

When the solenoid 149 (FIGS. 5 and 17) is de-energized, a four way valve 251 returns to its normal position to reverse the supply of water under pressure to a water motor 252. Water is supplied to valve 251 from a line 266 connected to the T-coupling 239. Pipes 254 and 267 connect the valve 251 to the water motor 252. When the solenoid 149 is de-energized, this flow reversal occurs and the water motor drives the valve 150 to a closed condition to block off water to the pipe sections 31-38. A filter 256 is in the line 266. The upper end of the line 66 is connected to a T-coupling 257 (FIG. 3) plugged at its left-hand end and connected to the pipe section 38 for supply of water thereto.

Figure 6:
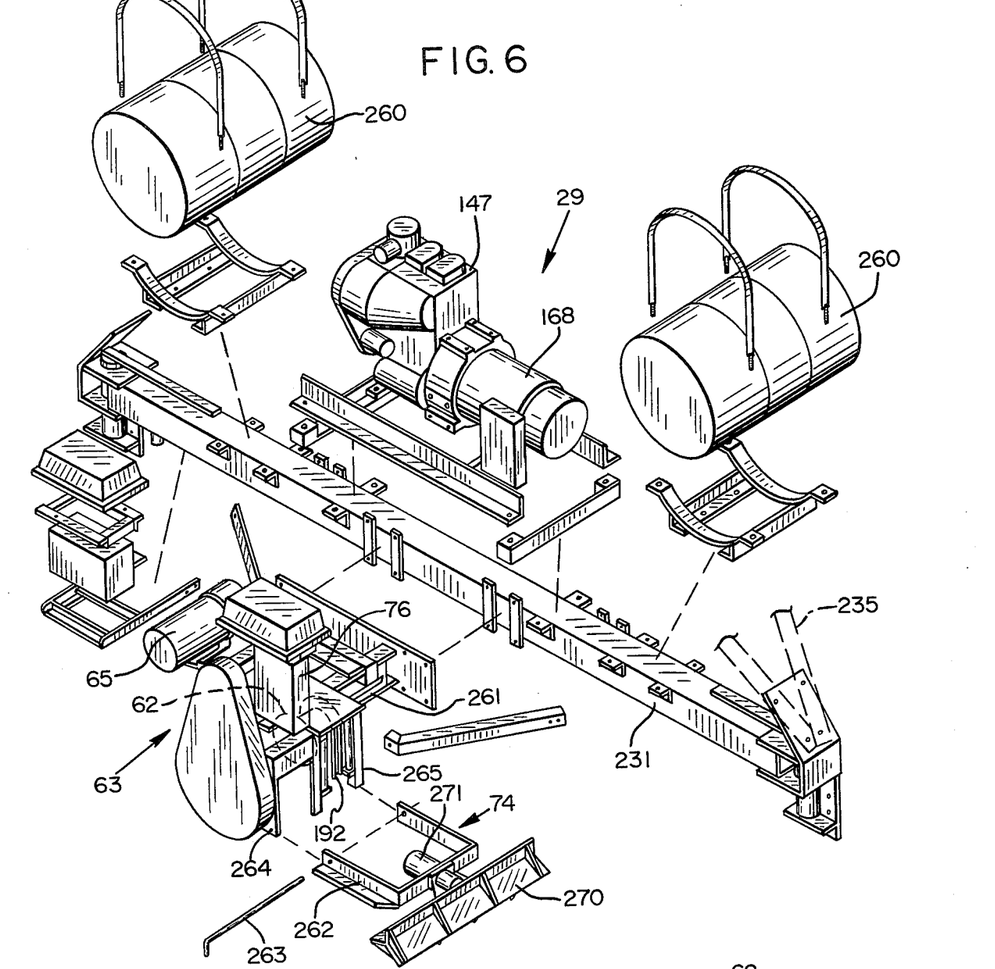
FIG. 6 is an enlarged, exploded, perspective view of a portion of the move of FIG. 1.

As best shown in FIG. 6, the chassis 231 carries the engine 147, the generator 168, fuel tanks 260 and the winch 63, an off-setting frame 261 mounting the winch on the chassis. The one-way or ratched device 74 comprises a fork 262 connected by a pin 263 to legs 264 and 265 of the frame 261 (or to similar legs (not shown) of the frame for travel of the line move in the opposite direction), the fork 262 always being mounted on the trailing side of the line move. A ground engaging foot 270 is connected by a pin-and-bearing 271 to the fork 262. The fork 262 is sufficiently long so that, with the foot 270 dug into the ground, fork 262 is always inclined substantially to the vertical, an angle of at least about 45° to the vertical being preferred. Preferably the winch drum turns in one direction so that, when the move travels in one direction, cable comes off the top of the drum. In contrast, when the line move is moved in the opposite direction, the cable comes off the bottom of the drum.

The tow coupling 58 (FIGS. 1 and 15) includes a U-shaped tube 290 with tubular couplers 291 and 292 of the hoses connected to its ends. A bracing rod 293 connects the end portions of the tube 290 together. A pair of straps 294 is welded to the leg of the tube 290 connected to the long hose 56 and the straps carry an eye 295 to which the cable 60 is connected.

The alignment switch devices 100, 106 and 132–136' (FIG. 1) are identical, so that only the alignment switch device 100 will be described in detail. The device 100 (FIG. 13) includes a horizontal fork 301 mounted rigidly on the pipe section 38 and a vertical fork 302 rigid on the pipe section 37, the forks 301 and 302 being pivotally connected to a ring 303 to form a universal joint. Each flexible coupling 41 connects the two pipe sections 37, 38 to allow the necessary universal pivoting therebetween. An arm 305 rigidly mounted on the top of the ring is pivoted to a connecting rod 306. Rod 306 in turn is pivoted to an arm 307 which is keyed to a shaft 308. A cam 309 is mounted to shaft 308 and the shaft is journaled in a base plate 310 which is fastened to the pipe section 37. The cam turns when pipe sections 37 and 38 pivot relative to one another about a vertical axis through ring 303. Upon a predetermined allowable relative pivoting or misalignment of the pipe sections 37, 38 a limit switch 100A (FIG. 17) is actuated and reverses its condition so that the tower motor starts when the precentage timer causes contact 215 to close. If for any reason, the misalignment becomes more severe, as, for example, if the towers 28 or 29 bog down, further turning of cam 309 occurs. This in turn causes opening of one of the limit switches 141 in the safety line 142 to shut down the move. These limit switches 100A and 141 are mounted on the base plate 310 and are covered by a cover 311.

Figures 7, 24:
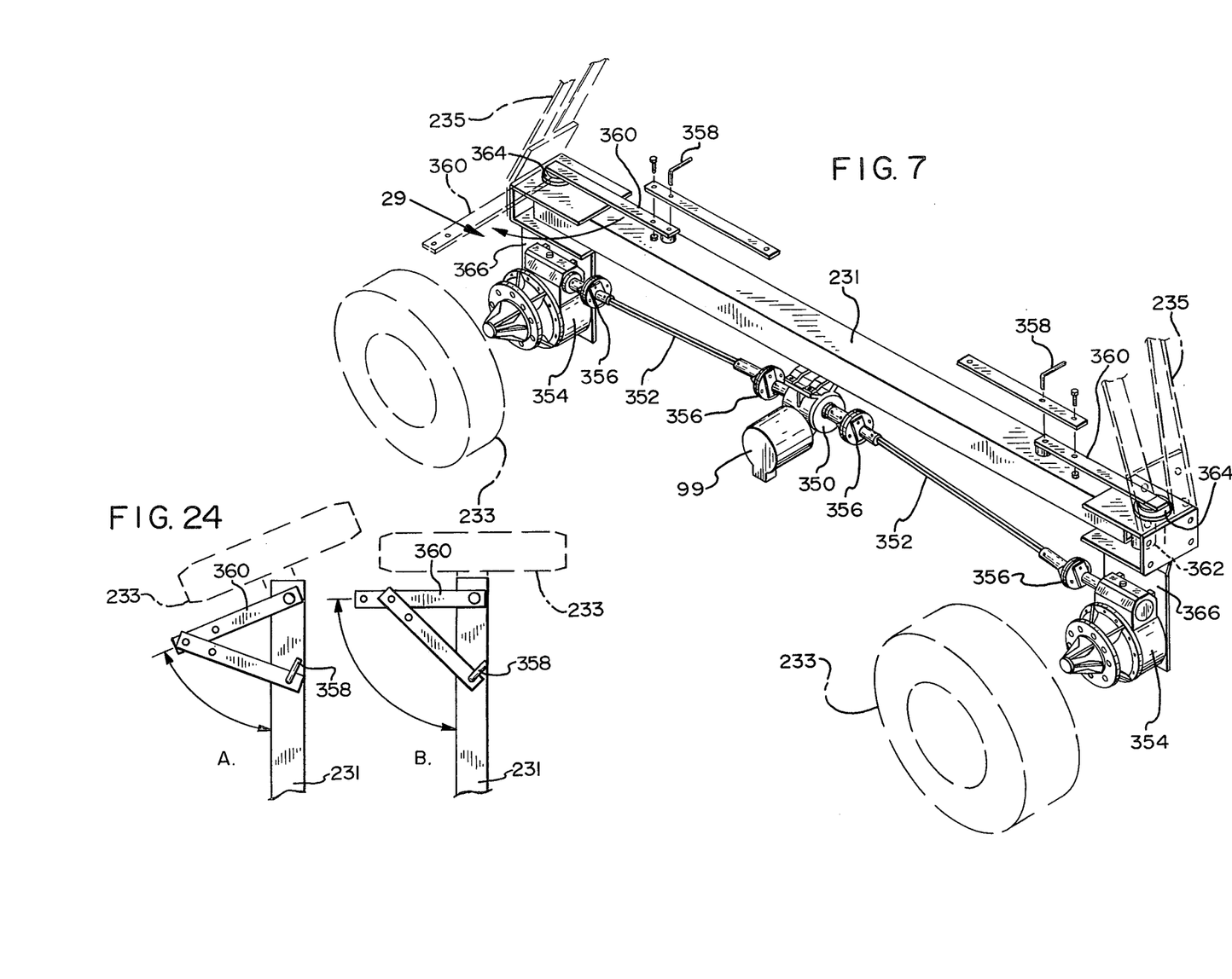
FIG. 7 is an enlarged, exploded, perspective view of a portion of the move of FIG. 1.
FIG. 24 is representations of a wheel of a tower of the move adjusted for endwise towing to adjacent fields.
Figure 8:
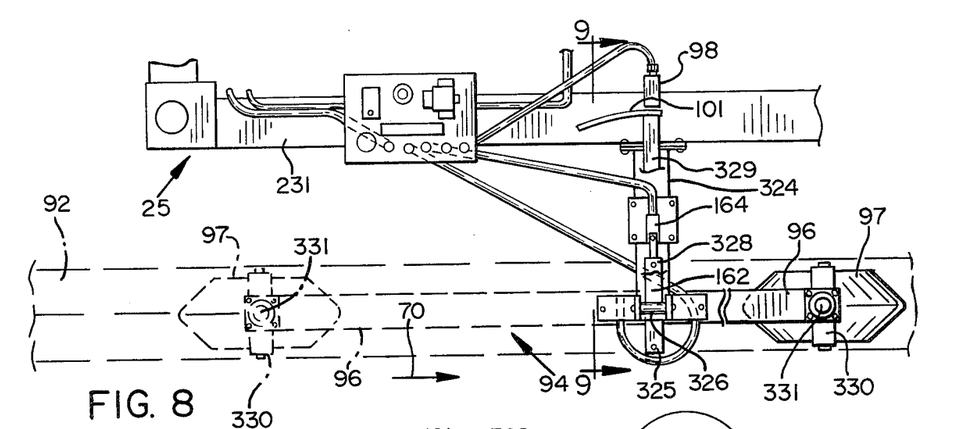
FIG. 8 is an enlarged, fragmentary top plan view of a portion of the move of FIG. 1.
Figure 20:
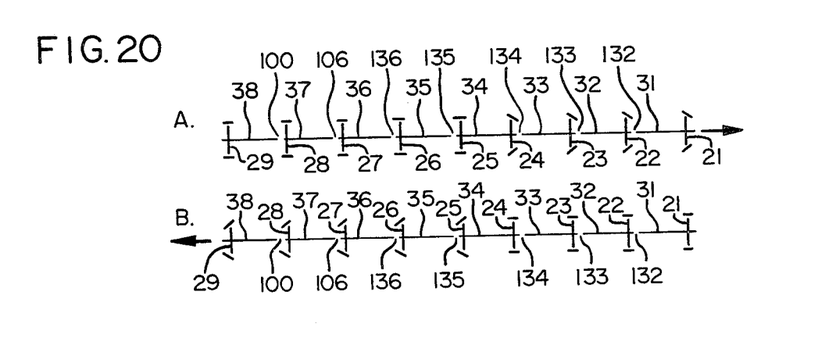
FIG. 20 is a top plan representation of the move adjusted for towing into an adjacent field.

The drive arrangements of the towers 21 to 29 are identical and only that of the carriage 29 is described in detail. The motor 99 (FIG. 7) drives a differential gear box 350, which drives flexible shafts 352 to drive the wheels 233 through reduction gears 354. For endwise towing of the move, the shafts 352 are disconnected from the gears 354 by uncoupling couplings 356, pins 358 are pulled to free handles 360 from the chassis, and the handles 360 are swung to turn shafts 362 in bearings 364 and wheel mounting brackets 366 to thereby turn attached gear boxes and the wheels 233. With shafts 352 disconnected, the wheels are in free wheeling. The wheels are either turned to a first or second position. When in the first position, shown in FIG. 24B, they are turned ninety degrees so that they are perpendicular to chassis 231. When in the second position, shown in FIG. 24A, the wheels are turned to toe-in somewhat (exaggerated in FIG. 24A for clarity). Following turning of the wheels, handles 360 are locked in place. This two-position adjustment of wheels 233 facilitates endwise towing of the move between fields as will be described with reference to FIGS. 20A and B.

In general, if the flexible coupling 41 which joins the ends of two pipe sections together is positioned at the forward side of the adjacent tower (forward meaning the side nearest the vehicle towing the move) then the wheels of that tower and all forward towers are toed-in. Because of this positioning of the flexible coupling, the forward pipe section of these two sections does not serve as an efficient tongue for the tower during towing and the tower, in the absence of toeing-in of its wheels, would tend to wander somewhat rather than follow a straight path as it is towed. In contrast, if the flexible coupling is positioned at the rearward side of the nearest tower, the wheels of that tower and rearward towers are set in their ninety degree position. For such towers, the forward pipe section acts as a tongue and consequently the towers tow easily without having to toe-in their wheels.

More specifically, with the move towed in the direction of the arrow in FIG. 20A, the wheels of towers 21 through 24 are toed-in, while the remaining wheels are in their ninety degree position. Conversely, with the move towed in the direction of the arrow in FIG. 20B, only the wheels of towers 25 through 28 are toed-in.

Figure 19:
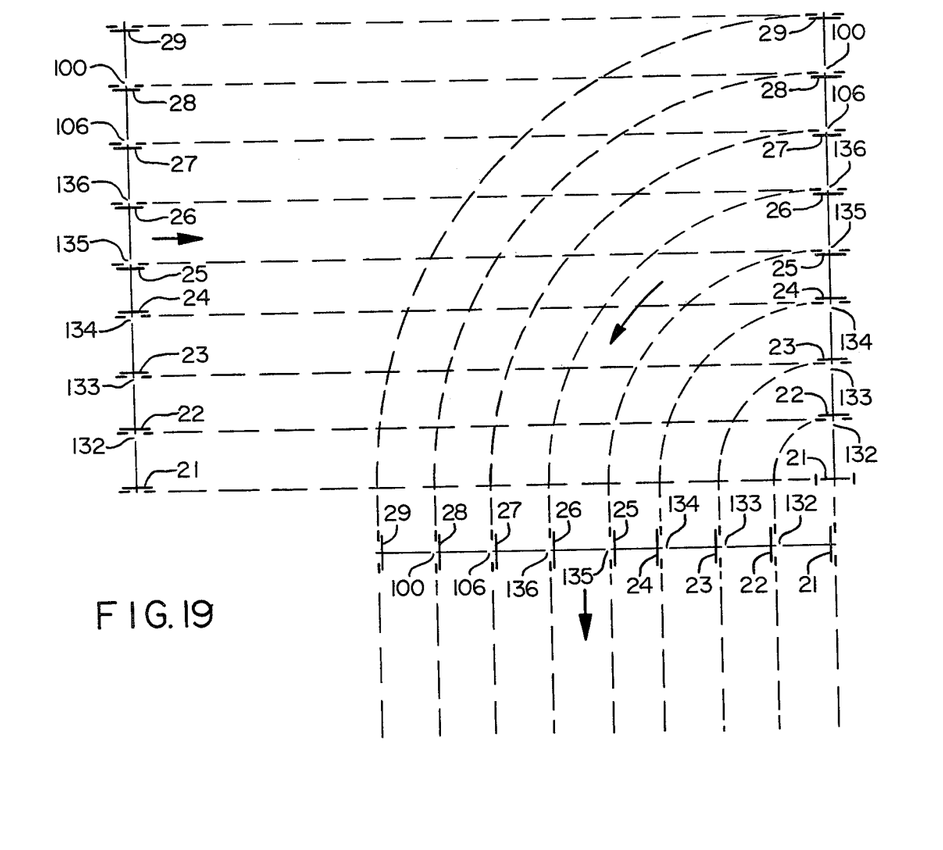
FIG. 19 is a top plan representation of the move traveling into an adjacent field.

For use in a field to go up one half and into another section, such as shown in FIG. 19, the move is swung about the carriage 21 like a circle move. That is, the motor drive shafts 352 of the carriage 21 are disconnected from the wheels 233, the handles 360 (FIG. 7) on this carriage are rotated to rotate the wheels ninety degrees. Also, the feeler mechanism 94 is reversed 180° and tied to the chassis 231 to lock the control circuit so that carriage 29 is continuously the master or lead tower. Under these conditions, the carriage 21 will free wheel and scribe a circle with the wheel base acting as its diameter and the wheels following the periphery. With carriage 29 acting as master all other carriages will slave except 21 which acts as the pivot. As a result, the move travels ninety degrees in FIG. 19 into adjacent field section. Of course, the move could be shifted in either direction about tower 21 and more or less than ninety degrees depending upon which field it is desired to water next. Also, tower 29 could be made the pivot.

Having illustrated and described the principles of my invention with reference to one preferred embodiment, it should be apparent to those persons skilled in the art that this invention can be modified in arrangement and detail without departing from such principles.

I claim:

1. In an irrigation line move, hose means resting on the ground and adapted for connection at one end thereof to a source of water;
   an irrigation line move including a pipe connected to the other end of the hose means and carriage means for moving the pipe;
   cable means connected to a portion of the hose means;
   and winch means on a portion of the line move for alternately pulling the cable means in to drag the hose means along the ground toward the line portion and for paying the cable means out.

2. The move of claim 1 including means for alternately stopping and moving the line move and means for actuating the winch means to pay out the cable means when said portion of the line move is being moved and for driving the winch means to pull the cable means in to drag the hose means along the ground toward the line portion when said portion of the line move is stopped.

3. The move of claim 1 or 2 including ground engaging leg means on the line move for automatically holding the move against rearward movement when the winch means is driven to pull in the cable means and permitting foward movement of the move.

4. In an irrigation line move, hose means for connection at one end thereof to a source of water;
   an irrigation line move including a pipe connected to the other end of the hose means and carriage means for moving the pipe;
   cable means connected to a portion of the hose means intermediate the ends of the hose means;
   and winch means on a portion of the line move for alternately pulling the cable means in and paying the cable means out; and
   a curved connector connected to the cable means and to the intermediate portion of the hose means to hold the hose means in a gentle curve.

5. The move of claim 4 in which one end of the move is adjacent to a water supply line extending along the direction of movement of the move and to the source of water, and means mounting the winch means in a position spaced substantially from said one end of the move so that the curved portion of the hose means between the cable means and the source is in a wide curve.

6. In an irrigation line move,
   hose means for connection at one thereof to a source of water;
   an irrigation line move including a pipe connected to the other end of the hose means and carriage means for moving the pipe;
   cable means connected to a portion of the hose means intermediate the ends of the hose means;
   and winch means on a portion of the line move for alternately pulling the cable means in and paying the cable means out;
   said winch means including a winch, a releasable drive adapted to drive the winch and to release the winch, and brake means operable when the drive releases the winch to slow unwinding of the winch, the hose means being elastic and contracting to unwind the winch when the winch is released.

7. The move of claim 6 in which the drive comprises an electric motor and the brake means comprises control means operable to operate the motor as a braking generator.

8. In an irrigation line move,
   hose means for connection at one end thereof to a source of water;
   an irrigation line move including a pipe connected to the other end of the hose means and carriage means for moving the pipe;
   cable means connected to a portion of the hose means intermediate the ends of the hose means;
   and winch means on a portion of the line move for alternately pulling the cable means in and paying the cable means out;
   said hose means comprising a U-shaped tubular connector connected to the cable means, a first hose connected to one end of the connector and to the pipe and a second hose connected to the other end of the connector and to the source of water.

9. In an irrigation line move,
   hose means for connection at one end thereof to a source of water and for connection at the other end thereof to the irrigation line move, said hose means defining a water flow path from the source of water to the line move;

cable means for connection to said hose means at a position spaced sufficient from the ends of the flow path to enable the positioning of the hose means into two bights; and winch means for alternately pulling the cable means in and paying the cable means out.

10. The apparatus according to claim 9 in which the first of said bights is shorter than the second of said bights, said second bight extending from the source of water to said cable means and said first bight extending from said cable means to the line move;

means for alternately stopping and moving the line more and means for actuating the winch means to pay out the cable means when the line move is being moved so as to not move the second bight while the line move is moving, and for driving the winch means to pull the cable means in and reposition the second bight when the line move is stopped, whereby only the first bight is moved as the line moves; and means for bracing te line move against rearwards movement as the winch means pulls in the cable means.

11. In an irrigation line move, hose means for connection at one end thereof to a source of water and for connection at the other end thereof to the irrigation line move, said hose means defining a water flow path from the source of water to the line move;

cable means for connection to said hose means at an intermediate portion of said flow path; and winch means for alternately pulling the cable means in and paying the cable means out; and in which the line move travels in a forward direction, a substantial portion of said hose means being positioned on the ground rearwardly of the said line move, said winch means comprising means for alternately pulling said cable means in to thereby drag the hose means along the ground toward the line move and paying the cable means out.

12. In an irrigation line move, hose means for connection at one end thereof to a source of water and for connection at the other end thereof to the irrigation line move, said hose means defining a water flow path from the source of water to the line move;

cable means for connection to said hose means at an intermediate portion of said flow path; and winch means for alternately pulling the cable means in and paying the cable means out; and in which the line move travels in a forward direction, said hose means comprising first and second hose sections, said first hose section being adapted for connection at one end to the source of water, said first hose section extending rearwardly from the source to a first location rearwardly of the move and being curved at said first location to extend forwardly from the first location to a second location which is also rearwardly of the move, the other end of said first hose section being coupled to one end of said second hose section at the second location, said second hose section extending rearwardly from the second location to a third location rearwardly of the line move and being curved at said third location to extend forwardly from the third location to the line move, the other end of the second hose section being adapted for connection to the line move; and said cable means being connected to said hose means at the second location.

13. The apparatus of claim 12 in which said first hose section is longer than said second hose section.

14. The apparatus of claim 12 in which said first hose section is of a length such that said hose means is set with the first hose section connected to the source of water at a water connection location which is located forwardly of the move and such that the line move travels forwardly of the water connection location as the line move operates between sets of said hose means.

15. The apparatus of claim 14 in which said second hose section is of a length which is longer than the distance between sets, such that the gentle curve is maintained in the second hose section at the third location as the line move travels between sets.

16. The apparatus of claim 12 in which said first and second hose sections are of a flexible material and including rigid means for maintaining a curve in said hose means at said second location.

17. The apparatus according to claim 16 in which said rigid means comprises a curved tubular connector means for interconnecting said first and second hose sections.

* * * * *